United States Patent [19]

Madsen

[11] 4,141,659
[45] Feb. 27, 1979

[54] BOWDEN WIRE SUBSTITUTE MECHANISM

[75] Inventor: Berthel F. Madsen, Chicago, Ill.

[73] Assignee: The United States of America as represented by the Secretary of the Navy, Washington, D.C.

[21] Appl. No.: 317,458

[22] Filed: Feb. 5, 1940

[51] Int. Cl.² .............................................. B41J 7/66
[52] U.S. Cl. ..................................................... 400/90
[58] Field of Search .................. 197/4; 35/4; 246/147; 400/90

[56] References Cited

U.S. PATENT DOCUMENTS

| Re. 20,167 | 11/1936 | Smith | 101/102 |
|---|---|---|---|
| 616,840 | 12/1898 | Hillard | 400/324 |
| 1,861,857 | 7/1932 | Hebern | 400/90 |
| 2,116,683 | 5/1938 | Lemmon et al. | 400/90 |

*Primary Examiner*—Verlin R. Pendergrass
*Attorney, Agent, or Firm*—John R. Utermohle

EXEMPLARY CLAIM

3. A ciphering unit, comprising a plurality of variable random circuits, a plurality of juxtaposed like mechanisms to change said circuits, each said mechanism being conditionable for operation or non-operation, means to condition each said mechanism for operation or for non-operation, each said conditioning means including a member having two functioning positions, a plurality of rectangular bails mounted one inside the other for rocking movement about a common horizontal axis, means in each said mechanism to rock a respective said bail, and adjustable means carried by each said bail to operate a respective said member whereby to condition for operation a mechanism that is conditioned for non-operation at the time such member is operated.

8 Claims, 3 Drawing Figures

BOWDEN WIRE SUBSTITUTE MECHANISM

This invention relates in general to means for transferring motion from one mechanical train to another and more particularly to means forming an efficient substitute for Bowden wires.

Among the several objects of this invention are:

To provide means for eliminating Bowden wire mechanisms for translating movement;

To provide, in a machine having a plurality of mechanical trains, a sturdy and reliable instrumentality for insuring the translation of movement from one train to another.

Other and further objects will become apparent as the following description is read in connection with the accompanying drawings, wherein.

This invention is of general application where a mechanical movement of this type is useful, but it is especially adapted as a substitute for the Bowden wires in coding machines of the type shown in the application of Larson, Levin and Thienemann, Ser. No. 317,454, filed Feb. 5, 1940, and more particularly to the mechanical movement embodied therein and particularly shown and claimed in the application of Albert H. Reiber, Ser. No. 317,455, filed Feb. 5, 1940, operable to effect sporadic changes in random electric circuits.

While Bowden wires are well known and widely used as flexible, thrust-transmitting means, they are rather delicate and are easily deranged, as by bending, etc. In machines of the kind disclosed in the above-identified applications, it has been observed that persons charged with handling the same are sometimes careless and it has even been observed that the Bowden wires have been grasped to pick up the machine. Owing to the fact that the movements must be translated from one mechanical train to another exactly as intended or the results obtained are useless, it is apparent that the motion translating means must act with unfailing accuracy. The instrumentality forming the subject of this invention is sturdy and not at all likely to be deranged or get out of order and furthermore offers no inducement to using the same as a handle for lifting the mechanism.

Figure 1:
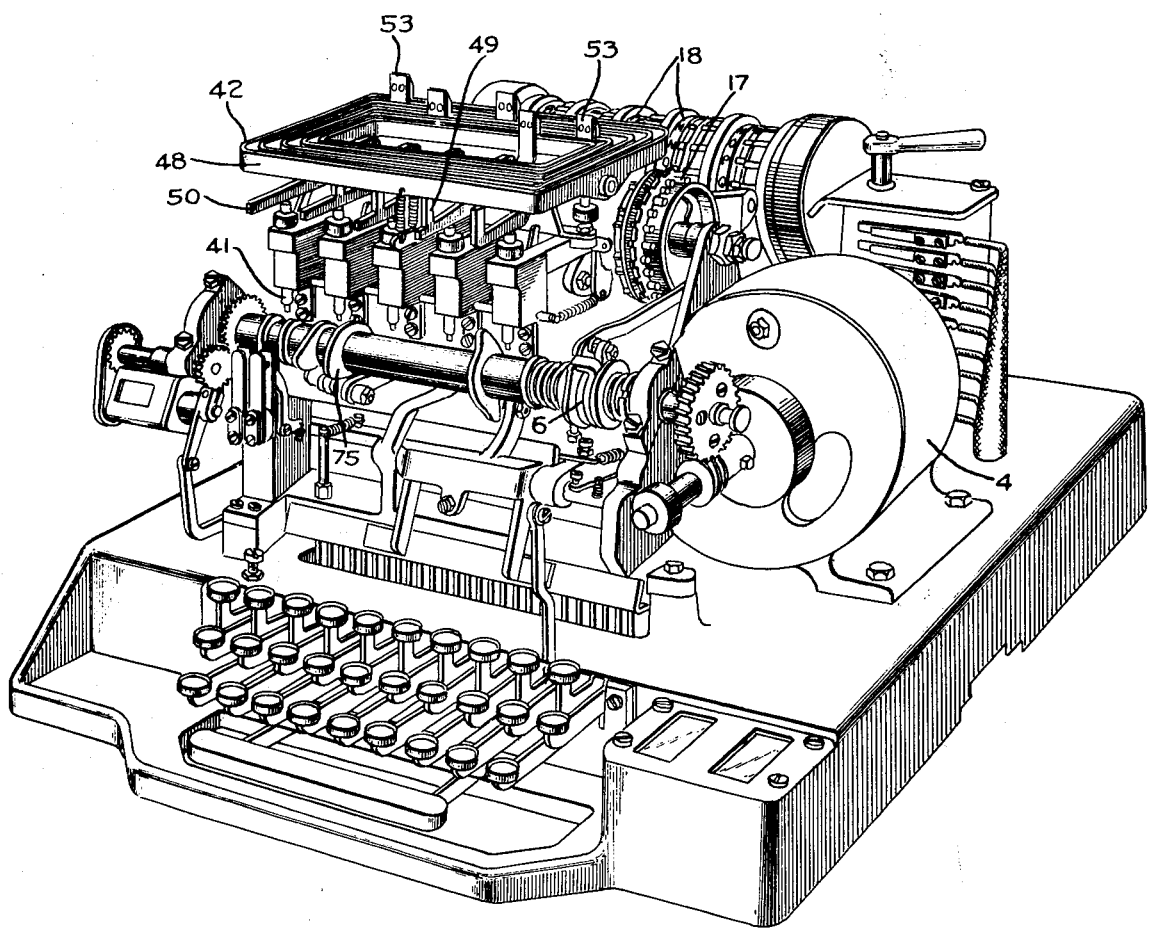
FIG. 1 is a perspective front view of a coding device to which my present invention is applied.
Figure 2:
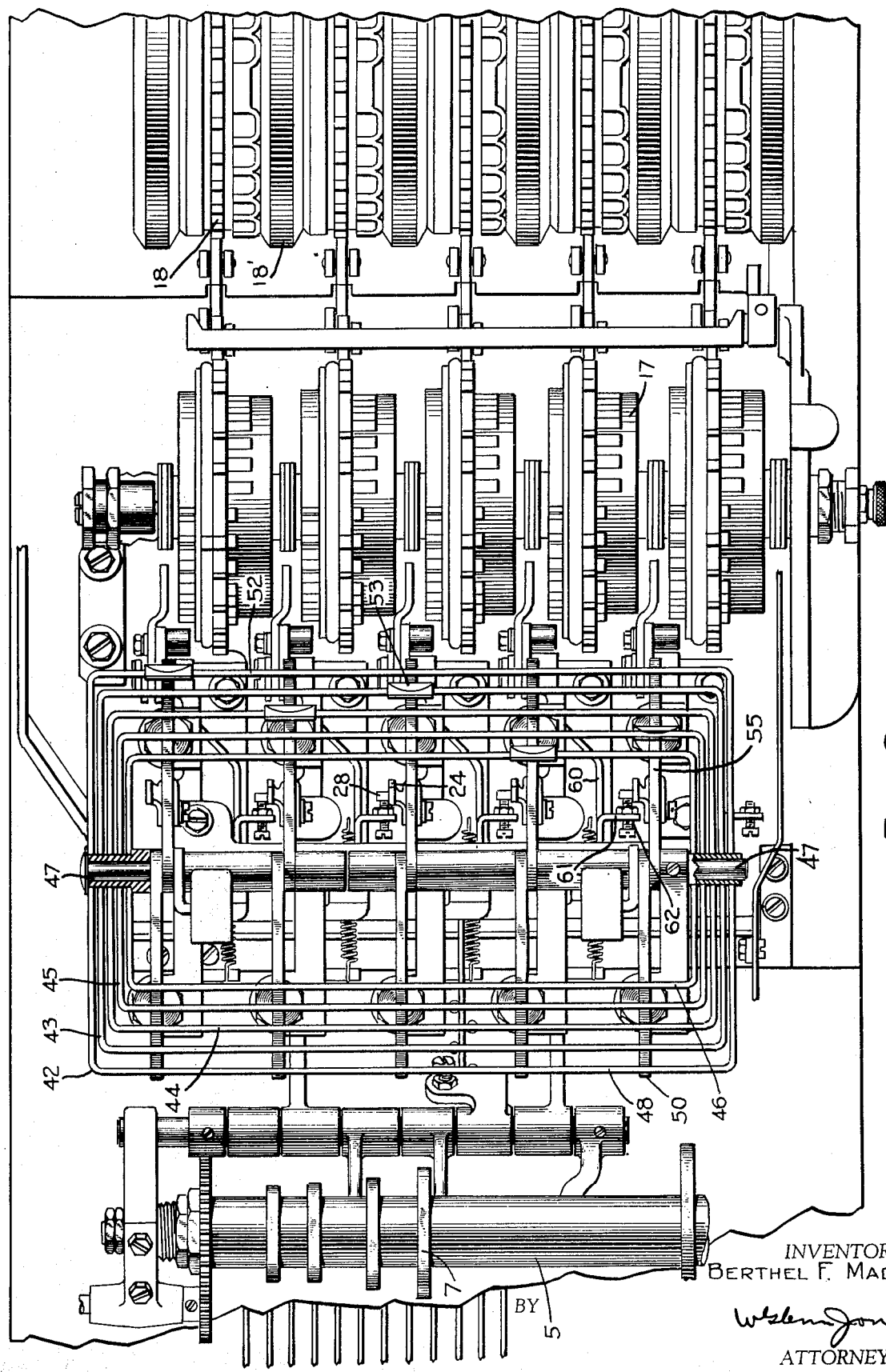
FIG. 2 is a top plan view of my present invention and the parts immediately associated therewith.

Referring now to FIG. 1, the motor 4 is connectible to cam sleeve 5 through a clutch 6, the details of which are unimportant for present purposes and hence will not be further described. On sleeve 5 is a cam 7 in contact with a roller 8 connected through arms 9 and 10 to a push bar bail 11 that is engageable with a shoulder 12 carried by push bar 13 when the push bar is conditioned for operation as hereinafter described. When the push bar 13 is so engaged by bail 11, the push bar is moved back to operate pawl lever 14 whereon is mounted a pawl 15 engageable with teeth 16 on the wheel 17, whereby the wheel is rotated through the distance between two adjacent teeth 16. At the same time, the random-circuit drum 18 associated with the wheel 17 is rotated one tooth.

Figure 3:
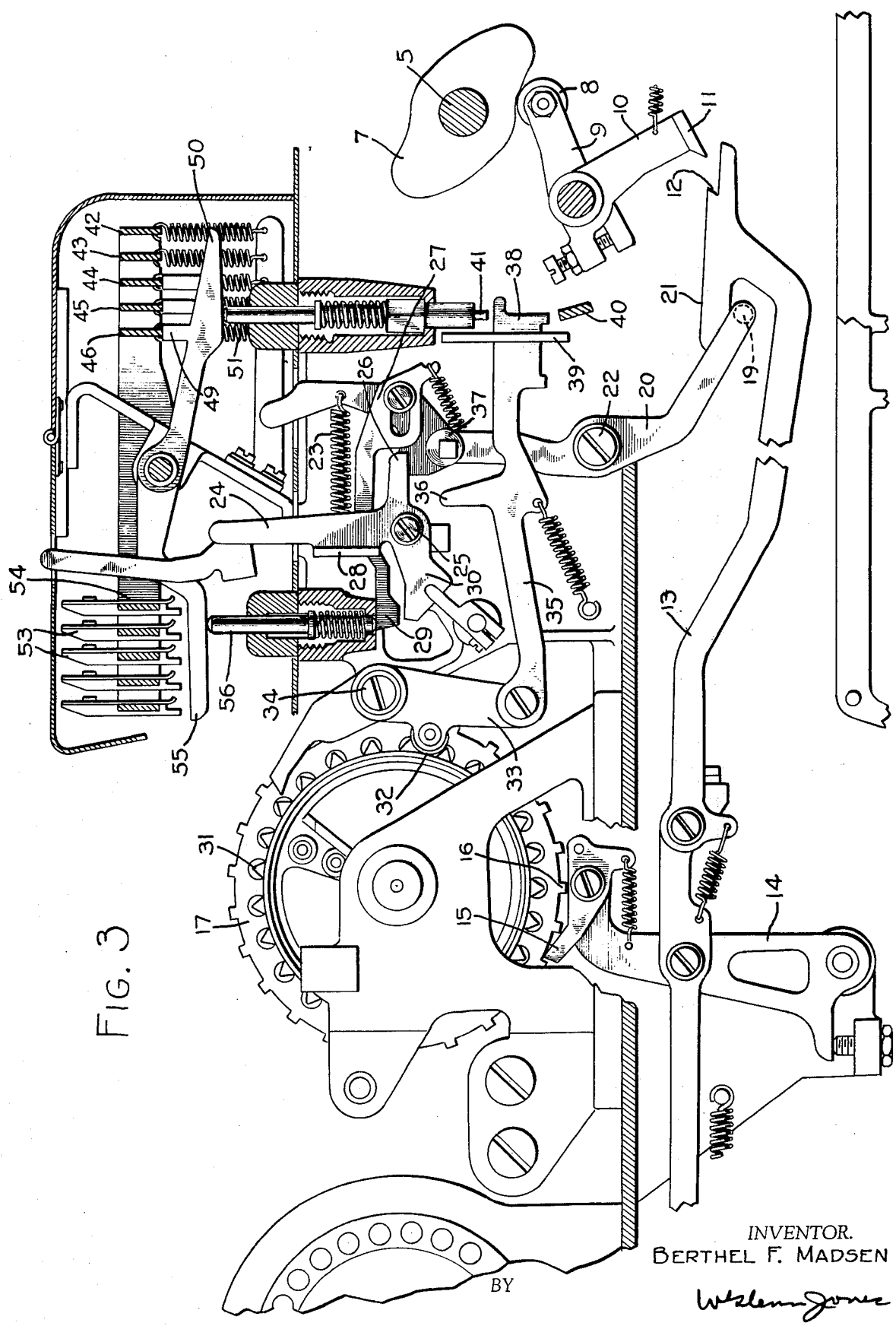
FIG. 3 is a detail side elevation of the mechanism shown in the plan view of FIG. 2.

The push bar 13 is lifted up into the path of bail 11, that is, it is conditioned for operation, by a stud 19 carried on conditioning lever 20 being raised against the rearwardly extending finger 21 on push bar 13. Conditioning lever 20 is pivoted at 22 and is connected by a contractile spring 23 to a latching lever 24 pivoted at 25 and having an arm 26 that engages a latching shoulder on conditioning lever 20 when in the position shown in FIG. 3. In this position, the push bar 13 is permitted to drop down out of the path of bail 11 so that the push bar is conditioned for non-operation. Pivotally mounted on conditioning lever 20 is transfer slide 27 extending rearwardly through a slot in laterally turned portion 28 of latching lever 24 and having its rearward end 29 disposed to contact arm 30 of latching lever 24 to disengage arm 26 from conditioning lever 20 when the said end 28 is depressed while lever 20 is latched.

It is to be understood that each of the drums 18 carries a plurality of conductive elements randomly connected between contacts on opposite faces thereof, and that each said element is connected, by wires through the spacers 18′, with a respective element in each other drum 18. The complexity of a coded message is much increased by changing the random circuits through drums 18 and spacers 18′ each time a character is coded.

To insure that such changes in the random circuits shall always be made, means are provided to transfer movement from one mechanical train to the other. These means include, in each train, a pivoted transfer lever having an arm 60 on one side of the pivot and an arm 61 on the other side thereof, the latter arm carrying a screw 62 that may be moved against laterally turned portion 28 of a latching lever 24.

When conditioning lever 20 is in unlatched position, the rear end 29 of the transfer slide 27 lies above the end of arm 60 of the transfer lever so that depression of said rear end 29 of the transfer slide 27 rocks the transfer lever to bring screw 62 into contact with laterally turned portion 28 and unlatches conditioning lever 20 in the adjacent train so the said adjacent train will operate to rotate the drum 18 therein.

Wheel 17 carries a plurality of pins 31 that are mounted to be slidable parallel with the axis of wheel 17 to permit positioning them either to contact roller 32 or not to contact the said roller. Roller 32 is carried by an arm 33 pivoted at 34 and having connected to its free end the translating lever 35 which has an upwardly extending projection 36 disposed to contact a stud 37 on conditioning lever 20 to move the conditioning lever to the latched position. The forward end 38 of translating lever 35 is slidably supported in a hanger plate 39 and, when roller 32 rides over a pin 31, the forward end 38 is moved into the path of a bail 40 whereby the said forward end is raised up to push upwardly the plunger 41.

Rectangular bails 42 to 46 are rockably mounted on horizontal trunions 47 for independent motion and are disposed one inside the other. The forward edge 48 of each rectangular bail is in contact with a finger 49 on a respective pivoted lever 50 that is held in contact with a respective plunger 41 by a contractile spring 51. Slidable upon the rearward side 52 of each of the rectangular pairs is a respective tab 53 that is frictionally held upon the bail by a leaf spring 54. Each tab 53 is disposed to contact a lever 55 resting upon a plunger 56 that is disposed to contact the rearward end 29 of a respective transfer slide 27.

It is apparent that if the push bar 13 in any of the mechanical trains is actuated by bail 11, the conditioning lever 20 must be unlatched to raise the push bar into operating position and that the consequent rotation of wheel 17 may or may not cause movement of translating lever 35, depending upon whether a pin 31 is positioned to contact roller 32 or not. In the event translating lever 35 is not moved, the train will be again actuated, since push bar 13 will still be held in the operating position. However, if the translating lever 35 is operated, the projection 36 will engage stud 37 and move conditioning lever 20 to the latched position, thus permitting push bar 13 to drop down out of the path of bail 11 and be conditioned for non-operation. However, the forward end 38 of translating lever 35 is engaged by bail 40 and applies a thrust to plunger 41, which in turn rocks a lever 50 and, through the associated rectangular bail, the motion is transferred to a lever 55 and thence to a plunger 56 whereby a train that is conditioned for non-operation will be changed to the operating condition and so the rotation of a plurality of wheels 17 and associated drum 18 is assured.

I claim:

1. A ciphering unit, comprising a plurality of functional trains; each said train including an individually rotatable drum carrying random circuit elements, an individually rotatable wheel substantially coplanar with said drum, a plurality of pins mounted in each wheel to be adjustable parallel to the axis of such wheel to operative or to inoperative position, reciprocable means conditionable for operation or for non-operation and when conditioned for operation being operable to impart simultaneous step-by-step rotation to said drum and wheel, a conditioning lever having latched and unlatched positions pivoted intermediate its ends and engageable at its lower end with said reciprocable means to condition said means for operation when in unlatched position, said lever having a rearwardly facing latching shoulder intermediate its pivot and its upper end, a pivoted latch having a forwardly extending arm engageable with said shoulder to hold said lever in latched position and a rearwardly extending arm and a laterally turned portion, a roller arm pivoted at one end, a roller carried by said arm lying in the path of such of said pins as are in operative position, a translating lever pivoted at one of its ends to the free end of said arm and slidably supported at its other end and having a latching projection on its upper side, a latching pin on said conditioning lever engageable by said projection to move said lever to latched position, means to retract said translating lever and hold said roller in the path of said pins, a transfer slide pivoted at its forward end on said conditioning lever, a pivoted transfer lever having a first arm disposed to be moved down by the rear end of said transfer slide when said conditioning lever is in unlatched position and a second arm to contact the laterally turned portion of the latch in the next adjacent train when said first arm is moved down, thereby to unlatch the conditioning lever in said adjacent train to condition said adjacent train for operation, said rear end of said slide contacting the rearwardly extending arm of the latch in the same train when said slide is moved down while said conditioning lever is in latched position thereby to condition the same train for operation, a front vertically slidable plunger contactible by said translating lever, a rear vertically slidable plunger disposed to contact the rear end of said transfer slide; means to swing upwardly the forward end of any said translating lever moved forwardly by the associated said roller riding over a said pin, a rocker lever associated with each front plunger disposed to have its forward end moved up by such plunger and pivoted at its rear end and having an upwardly extending finger, a pivoted rocker lever contactible with each rear plunger to move such plunger down, rectangular bails equal in number to said trains mounted one inside the other to rock about a common horizontal axis, the forward side of each said bail being contacted by a respective said finger on a rocker lever, a tab on the rear side of each bail adjustable therealong to contact a selected rocker lever associated with a rear plunger, and means connecting each circuit element in each drum into an individual circuit with an element in each other drum.

2. A ciphering unit, comprising a plurality of variable random circuits, means including a plurality of juxtaposed like mechanisms to vary said circuits, each said mechanism including an element conditionable for operation or non-operation, a conditioning lever having latched and unlatched positions pivoted intermediate its ends and engageable at its lower end with said element to condition said element for operation when in unlatched position, a latch engageable with said lever to hold said lever in latched position, sporadically acting means actuated by said element to move said lever to latched position, said sporadically acting means including a swingable translating lever, a transfer slide pivoted on said conditioning lever operable to release said latch when said conditioning lever is in latched position, a pivoted transfer lever having a first portion engageable by said slide when said conditioning lever is in unlatched position and a second portion to engage and release a latch in a next adjacent mechanism when said first portion is engaged by said slide, a forward plunger operable by said translating lever, a forward rocker lever actuatable by said plunger and having a lateral finger, an after plunger disposed to actuate said slide, an after rocker lever disposed to actuate said after plunger; a plurality of rectangular bails mounted one inside the other for rocking about a common horizontal axis, the forward side of each said bail being contacted by a respective said lateral finger, a respective tab on the after side of each said bail adjustable to contact a selected respective after rocker lever, and means to actuate said elements when said elements are conditioned for operation.

3. A ciphering unit, comprising a plurality of variable random circuits, a plurality of juxtaposed like mechanisms to change said circuits, each said mechanism being conditionable for operation or non-operation, means to condition each said mechanism for operation or for non-operation, each said conditioning means including a member having two functioning positions, a plurality of rectangular bails mounted one inside the other for rocking movement about a common horizontal axis, means in each said mechanism to rock a respective said bail, and adjustable means carried by each said bail to operate a respective said member whereby to condition for operation a mechanism that is conditioned for non-operation at the time such member is operated.

4. Means for effecting random sporadic operation of a plurality of juxtaposed like mechanisms that are conditionable for operation or non-operation, comprising a plurality of rectangular bails mounted one inside the other for rocking about a common axis, a movement transmitting member in each said mechanism to rock a respective said bail at a predetermined phase in the operation of such mechanism, a movement receiving member in each said mechanism, means controlled by each said movement receiving member to condition for operation a mechanism not at that time operating, and means selectively adjustable on each said bail to actuate a respective movement receiving member when such bail is rocked by a motion transmitting member.

5. Means for effecting random sporadic operation of a plurality of juxtaposed like mechanisms that are conditionable for operation or non-operation, comprising a plurality of bails each mounted to be rockable and having a first portion on one side of the axis of rocking and a second portion on the opposite side of said axis, a movement transmitting member in each said mechanism to transmit rocking movement to a respective said first portion, at a predetermined phase in the operation of such mechanism, a movement receiving member in each mechanism, means controlled by each movement receiving member to condition for operation a respective mechanism not at that time operating, and means selectively adjustable on each said second portion to actuate a respective movement receiving member when such bail is rocked.

6. Means for effecting random sporadic operation of a plurality of juxtaposed like mechanisms that are conditionable for operation or non-operation, comprising a plurality of nested bails mounted for rocking motion about a common axis, a movement transmitting member in each said mechanism to transmit rocking motion to a respective bail, a conditioning member in each said mechanism, means to latch said conditioning member in non-operation position, an element adjustably mounted on each said bail, intermediate devices operable by a respective said element to disengage a respective said latching means to release the conditioning member controlled by such latching means for movement to the operation position, and means in each said mechanism sporadically and randomly operable to latch the respective conditioning member again in non-operation position.

7. Means for effecting random sporadic operation of a plurality of juxtaposed like mechanisms that are conditionable for operation or non-operation, comprising a plurality of nested bails mounted for rocking motion about a common axis, means to transfer movement from a said mechanism that is operating to rock a respective said bail, and means actuatable by a bail so rocked to condition for operation a respective other mechanism not operating at that time.

8. Means for effecting random sporadic operation of a plurality of juxtaposed like mechanisms that are conditionable for operation or non-operation, comprising a plurality of nested bails mounted for rocking motion about a common axis, means to transfer movement from a said mechanism that is operating to rock a respective said bail, conditioning means actuatable to condition for operation a said mechanism not operating, and an element adjustably mounted on each said bail movable to actuate any one of said mechanisms when said bail is rocked.

* * * * *